United States Patent [19]

Marklew

[11] Patent Number: 4,705,058
[45] Date of Patent: Nov. 10, 1987

[54] PLUG VALVE

[75] Inventor: David S. Marklew, Walsall, England

[73] Assignee: Glynwed Tubes and Fittings Limited, Cannock, England

[21] Appl. No.: 869,415

[22] Filed: Jun. 2, 1986

[30] Foreign Application Priority Data

Jun. 3, 1985 [GB] United Kingdom ............... 8513925

[51] Int. Cl.⁴ .................................................. F16K 5/04
[52] U.S. Cl. ....................................... 137/15; 251/309; 29/157.1 R
[58] Field of Search ................ 251/309; 137/315, 375, 137/15; 29/157.1

[56] References Cited

U.S. PATENT DOCUMENTS

| 2,836,388 | 5/1958 | Rukus | 251/309 X |
| 3,199,835 | 8/1965 | Freod | 251/309 |
| 3,367,359 | 2/1968 | Johnson | 137/375 |
| 3,508,573 | 4/1970 | Smith | 137/375 |
| 3,857,546 | 12/1974 | Quirk | 137/375 X |
| 4,257,575 | 3/1981 | Runyan | 251/309 X |

Primary Examiner—A. Michael Chambers
Assistant Examiner—John C. Fox
Attorney, Agent, or Firm—Thomas H. Murray; Clifford A. Poff

[57] ABSTRACT

A plug valve comprises a plug rotatable in a body of plastics. The plug fits closely within a thin walled metal can. The valve body is formed by moulding around the can and plug, the can thereafter remaining fixed within the valve body, while the plug is rotatable in the can. Seals which are also embedded in the valve body during moulding project through the fluid passage openings in the can to engage the surface of the plug. The provision of the can prevents damage to the plug during moulding of the valve body and prevents the plug from being bonded to the valve body, or the valve body shrinking onto the plug.

3 Claims, 18 Drawing Figures

PLUG VALVE

BACKGROUND OF THE INVENTION

THIS INVENTION relates to a plug valve, i.e. to a valve of the type in which a plug, having a passage therethrough, is mounted for rotation about an axis transverse to said passage in a body providing a passage therethrough, the plug being located intermediate the ends of the passage in the body and the arrangement being such that in one angular position of the plug about said axis the passages in the plug and in the body are in register with one another to allow the passage of fluid through the valve via said passages whilst in another position of the plug about said axis, the passages through the body and the plug are out of register with one another to prevent the flow of fluid through the valve.

Plug valves are widely used for various purposes, for example, as shut off valves for gas pipes supplying domestic or commerical premises. Since such shut off valves are, by their nature, accessible to and intended to be used by unskilled persons not under the control of the gas supply authority, it is desirable that such a valve should have no provision for adjustment or dismantling such as an unskilled person might be tempted to undertake. Furthermore, it is essential that the amount of torque required to operate the valve should be controlled within closely defined limits over the life span of the valve such that the valve cannot be operated without attachment of a suitable key to provide adequate leverage and yet such as to ensure that the valve will certainly be operable by one man after the attachment of such a key.

SUMMARY OF THE INVENTION

It is an object of the present invention to provide a plug-valve meeting the above-noted criteria and which is simple and economical to manufacture and reliable in operation.

According to one aspect of this invention there is provided a plug valve comprising a body affording a passage for a fluid therethrough, a plug mounted in said body, intermediate the ends of said passage, the plug having a passage therethrough for fluid, the plug being mounted for rotation in said body, about an axis transverse to said passages, between a position in which said passages in the plug and the valve body are in register, to allow fluid to pass through the valve, and a position in which said passage in the plug is out of register with said passage in the body to prevent passage of fluid through the valve, said plug having an operating stem, of reduced diameter compared with the plug, extending therefrom along said axis, and projecting from said body and wherein said body is a monolithic component of moulded plastics material which surrounds the plug and closely embraces said spindle whereby the plug cannot be removed from the body without destruction of the body, and wherein the plug is received as a close rotatable fit within a metal can provided with ports aligned with said passage in said body, the can being embedded fixedly in the body, the body having been formed by moulding or casting the plastics material thereof around the can and plug.

It is also an object of the present invention to provide an improved method of manufacturing a plug valve of the above noted type.

According to a second aspect of the invention, there is provided a method of manufacturing a plug valve including providing a plug with a passage therethrough and a spindle extending therefrom along an axis transverse to said passage, providing a metal can of a form to receive said plug as a close rotatable fit, permitting rotation of the plug in the can about said axis, the can having, in the wall thereof, ports for registration with said passage in the plug, said spindle being of reduced diameter with respect to said plug, the method further comprising inserting said plug in said can, moulding or casting plastics material, in a liquid or plastic condition, around said plug and can to form, after solidification of the plastics material, a body of said plastics material surrounding said plug and can and embracing said spindle, with the spindle projecting from said body, said body having a passage therethrough which is in register with said ports in the can and which in one rotational position of the plug about said axis in in register with said passage in the plug and in another rotational position of said plug is blocked by the plug.

BRIEF DESCRIPTION OF THE DRAWINGS

Embodiments of the invention are described below by way of example with reference to the accompanying drawings.

In the Drawings.

DESCRIPTION OF THE PREFERRED EMBODIMENTS

In the following description of various embodiments, like references denote like parts.

Figure 1A:
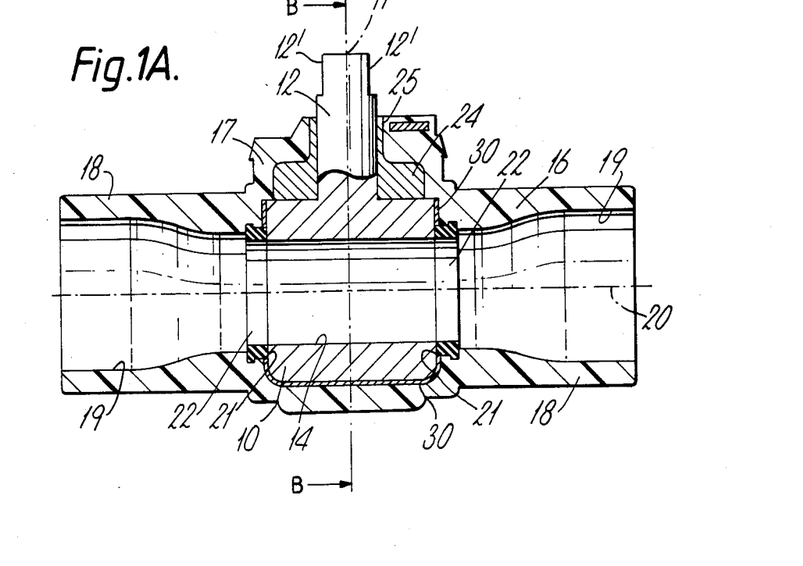
FIG. 1A is a view in vertical section through a plug valve embodying the invention.
Figure 1B:
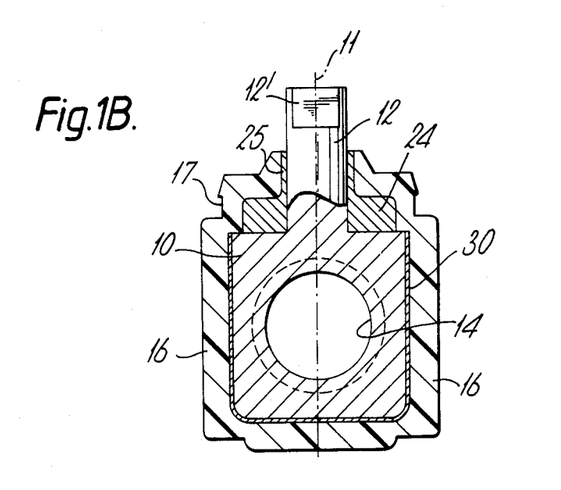
FIG. 1B is a view in section along the line B—B in FIG. 1A.

Referring to FIGS. 1A and 1B, a plug valve embodying the invention comprises a substantially cylindrical plug 10 with a cylindrical stem 12 extending axially from one end of the plug, the stem 12 being of smaller diameter than the plug 10. A cylindrical bore or passage 14 is formed diametrically through the plug 10 perpendicular to the longitudinal axis 11 of the stem 12 and plug 10. The plug 10 is mounted within a body 16 of plastics material which entirely surrounds the plug 10 (although being spaced from the major part of the surface of the plug 10 by other components in the embodiment of FIGS. 1A and 1B as discussed below) and through which body 10 the spindle 12 projects at its upper end. The body 16 includes a central portion accommodating the plug 10 and, extending on opposite sides of the centre portion, respective tubular spigots 18 aligned along an axis 20 passing diametrically through the plug 10. In one angular position of the plug 10 about the axis 11, shown in FIGS. 1A, the bore 14 registers with the internal passageways 19 provided in the spigots 18 to provide a through passage for fluid flow through the valve. This is the open position of the valve. The plug 10 is rotatable, about the axis 11, through 90° between the open position shown in FIG. 1A and a closed position in which the peripheral wall of the plug 10 entirely blocks off the inner end of each of the passages 19. Disposed within the body 16, at the inner ends of the passages 19, are annular seals 22 which bear sealingly upon the peripheral surface of the plug 10. The central part of the valve body 16, in which the plug 10 is accommodated, has a generally cylindrical neck portion 17 extending upwardly from the remainder of the valve body, coaxial with the stem 12, and through which the stem 12 extends. The stem 12 is surrounded by a bearing 24 formed separately from the body 16 and engaging the flat upper surface of the plug 10 and including a sleeve 25 extending upwardly to the upper surface of the body 16 and sealingly engaging the stem 12. The plug 10 fits snugly within a cylindrical thin-walled metal can 30 which is closed at its bottom and open at its upper end, with the upper edge of the wall of can 30 being substantially flush with the uppper surface of the plug 10. The wall of the can 30 has ports 21 formed therein at diametrically opposed positions, the ports 21 being aligned with one another on the axis 20. The seals 22, over their regions closest to the surface of the plug 10, fit closely within the ports 21.

The body 16 is a unitary, monolithic component formed by moulding or casting plastics material around the assembled plug 10, can 30, seals 22 and bearing 24. By way of example, the body 16 may be formed in a mould within which the plug 10, seals 22 and bearing 24 are supported by mould inserts which, in addition to defining the walls of the passages 19 also extend within the annular seals 22 and within the bore 14, the free end of the stem 12 passing sealingly through a wall of the mould.

By way of example, the body 16 may be of a thermoplastic material, such as medium density polyethylene and may be formed by injection moulding in such a mould, or the body 16 may be of a thermosetting material and formed by casting such a material in such a mould.

It will be noted that the seals 22 project slighly inwardly towards axis 20 from the adjoining wall surfaces of the passages 19 and present annular shoulders facing towards the outer ends of the respective passageways 19. The mould inserts used to define the passages 19 and to support the seals 22 and locate the plug 10 preferably have each a first part complementary in shape to the flaring passages 19, and a cylindrical end part with an outer diameter corresponding to the internal diameter of the passage 14 and seals 22, and an annular shoulder extending between the first part and the cylindrical part and which engages said shoulder of the respective seal 22 to pre-stress the seal into engagement with the plug 10 whilst the body 16 is moulded around the plug and seals, the body, when solidified serving, by its engagement with the remainder of said seals, to maintain the pre-stressing of the seals against the periphery of the plug. After injection of the molten plastics material into the mould and cooling of the same, (where the body is formed by injection moulding) the mould inserts can be moved outwardly along the axis 20 and the mould opened to allow the complete valve to be extracted therefrom. It will be appreciated that, in use of the valve, the can 30 is held stationary in the valve body by adhesion of the plastics material of the body 16 to the outer surface of the can 30, and also by the seals 22. Whilst it might be thought that a satisfactory result could be obtained by omitting the can 30, it has been found that, in practice, without the can 30, it is not possible reliably to ensure release of the plug 10 from the surrounding plastics material of the valve body, to allow rotation of the plug 10 within the body. Furthermore, it has been found that unless the can 30 is made of metal, it is not possible reliably to control the effective torque required to rotate the plug within the body within the defined parameters. By using the construction shown, it is possible to ensure that the plug is a close sealing within the can and yet is freely rotatable within the can and to control rotational friction between the can and the plug within the specified limits of applied torque.

Figure 2A:
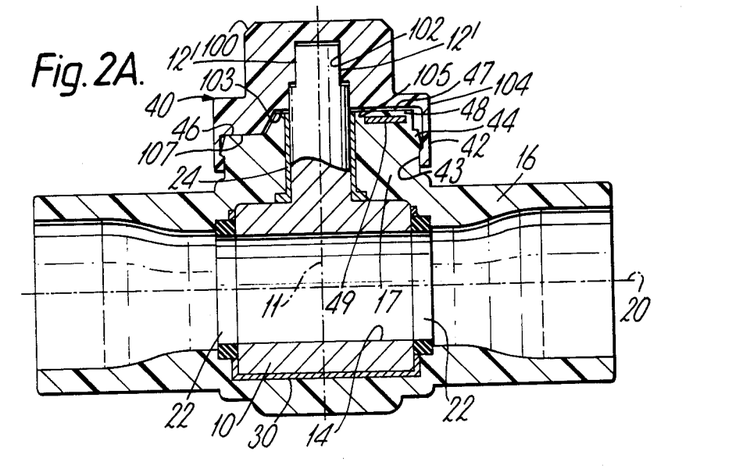
FIG. 2A is a view in vertical section, of another form of valve embodying the invention.
Figure 2B:
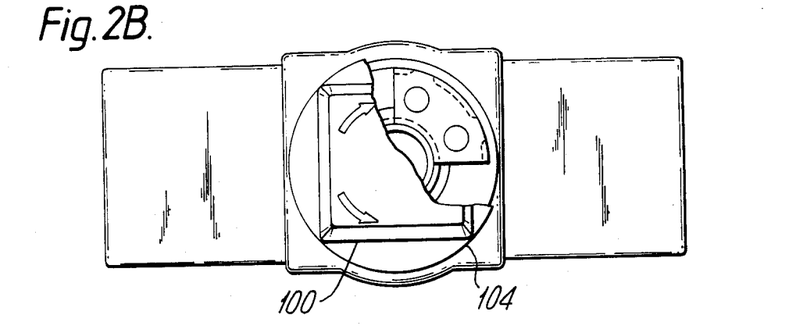
FIG. 2B is a plan view, partly broken away, of the valve of FIG. 2A.
Figure 2C:
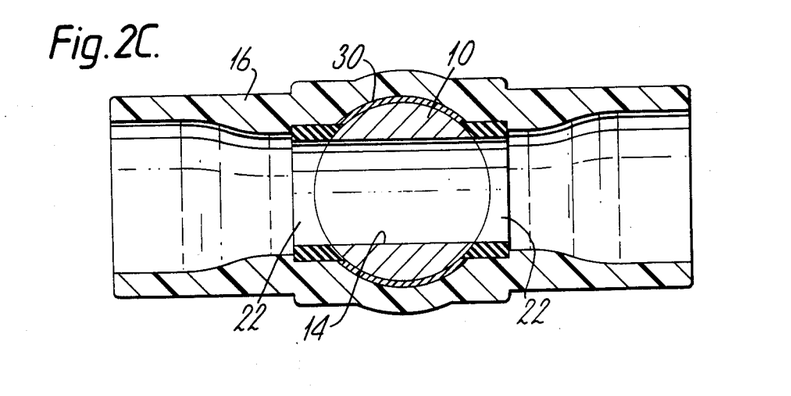
FIG. 2C is a view, in horizontal section, of the valve of FIGS. 2A and 2B.

FIGS. 2A to 2C illustrate another form of the valve which is similar to that of FIGS. 1A and 1B except that the can 30 and the plug 10 have a relatively sharp lower edge instead of a gently radiussed lower edge as in FIG. 1. Furthermore, the bearing sleeve 24 has the form of a cylinder which surrounds the spindle 12 of the plug and prevents the moulded plastics material of the body 16 engaging the peripheral surface of the spindle 12 and gripping the spindle 12 tightly during shrinking of the plastics material of the body. The sleeve 24 is provided with a flange at its lower end, which flange engages the top of the plug, leaving only part of the upper surface of the plug exposed to the plastics material of the body 16. By appropriate selection of the width of the flange, it is possible to control the force resulting from the shrinkage of the plastic body on cooling to ensure that the plug operating torque is maintained within the defined parameters.

The upper free end of the spindle 12 in the embodiments of FIGS. 1 and 2 is provided with diametrically opposite flats 12' whereby the upper end of spindle 12 has a non-circular cross section and can be engaged by a formation, of complementary non-circular cross section, provided on an operating cap 40. The cap 40 has an upper portion 100 which is of square cross section as viewed in plan (See FIG. 2B), to allow it to be engaged by an appropriate operating lever or key, the upper portion 100 being provided in its underside with an axial recess 102 of cross section complementary with the free end of the spindle 12 and receiving the same. The cap 40 further has a lower portion 104 of circular shape as viewed in plan which extends over the central neck portion 17 of the body 16, this portion 104 providing a skirt 42 which extends downwardly around the outer periphery of the neck portion 17 and has a rib 43 internally adjacent its lower edge which engages below an annular collar 44, around the neck portion 17. The collar 44 is of generally saw-toothed shape in axial section so that in assembly of the valve, when the cap 40 is pushed downwardly on to the stem 12, the skirt 42 is pushed over the neck portion 17 and the rib 43 is resiliently expanded radially as it passes over the upwardly facing sloping ramp portion of the collar 44 and snaps into engagement behind the collar 44 to retain the cap captive on the valve body 16. The cap 40 is preferably of ABS plastics or of mica-filled polypropylene.

Figure 8:
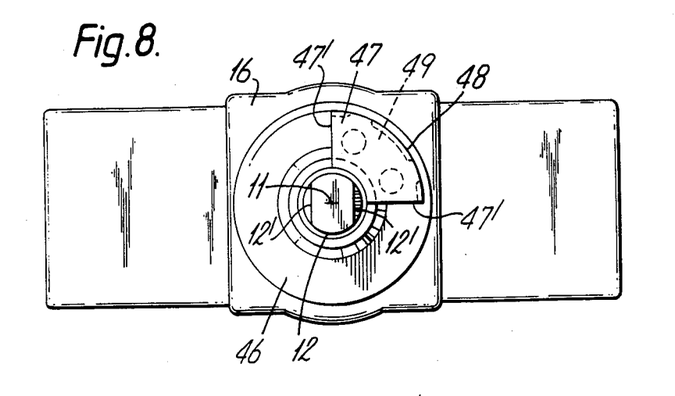
FIG. 8 is a plan view of any of the valves of FIGS. 1 to 5, with the operating cap omitted.

Over its major part the neck portion 17 of the valve body 16 terminates in an upwardly facing flat surface 46 which lies at a level somewhat lower than the upper surface of the valve body 16 in the immediate vicinity of the spindle 12, but over the remainder of the neck portion 17 terminates in an upwardly facing flat surface 47 which lies at the same level as the region immediately adjacent the spindle 12 and thus at a substantially higher level than the surface 46. As shown in FIG. 8, the portion 48 of the body 16 providing the surface 47 extends over a sector of 90° from the axis 11 of the plug and is limited by mutually perpendicular vertical abutment faces 47' each extending radially with respect to the axis 11, from surface 47 to surface 46. The cap 40, on the other hand, has, around the entrance to recess 102, a central recessed portion 103 which receives the central part of the neck portion 17 immediately adjacent the spindle 12, and has an equally deep recessed region 105, extending over 180° of arc relative to the axis 11 and accommodating the portion of the body 16 affording the surface 47. The cap 40 also has a portion, extending over the remaining 180° of arc, which is less deeply recessed and affords a downwardly facing surface 107, at a lower level than the surface 47, which closely opposes the surface 46 and terminates, at each end of its 180° extent, in vertical flat abutment faces 109, extending diametrically relative to the axis 11, for engagement with the faces 47' of the raised portion of the neck 17. The abutment faces 109 cooperate with the respective abutment faces 47' to limit the cap 40 to rotation through 90° relative to the body, corresponding to movement of the plug 10 between the fully open and fully closed positions of the valve. A metal reinforcing plate 49, e.g. of stainless steel or galvanised mild steel is incorporated into the formation 48 during moulding of the body 16.

Figure 3:
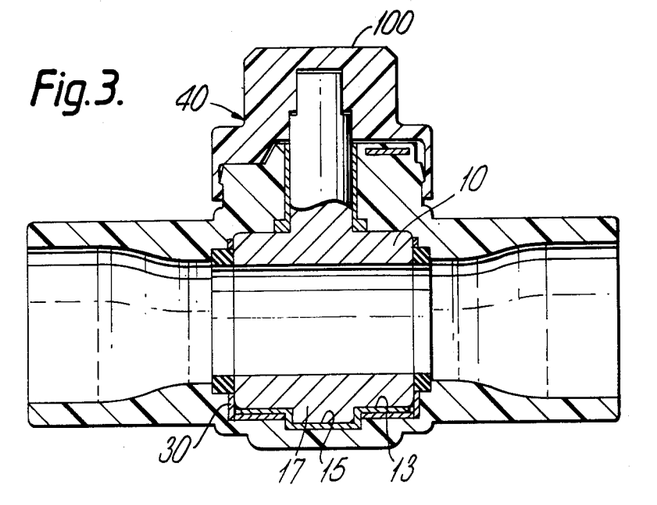
FIG. 3 is a view, similar to FIG. 2A, of a variant of the valve of FIG. 2A.

The valve of FIG. 3 differs from that of FIG. 2 only in that the can 30 has a central aperture in its base which receives a central projection in the underside of a bearing plate 13. The plate 13 has a central circular depression 15 in its upper surface, corresponding to the projection from its lower surface and this depression 15 receives, as a close rotating fit, a short cylindrical boss 17 projecting downwardly from the bottom of the plug 10. The depression 15 and boss 17 assist in locating the plug 10 for rotation in the body 16. In manufacture of this embodiment, before assembly of the other components prior to moulding the valve body, the plate 13 is first inserted in the bottom of the can 30 from the open upper end of the can, then the plug 10 is inserted from the upper end of the can, and the other components assembled, and the body moulded, as already described above.

Figure 4:
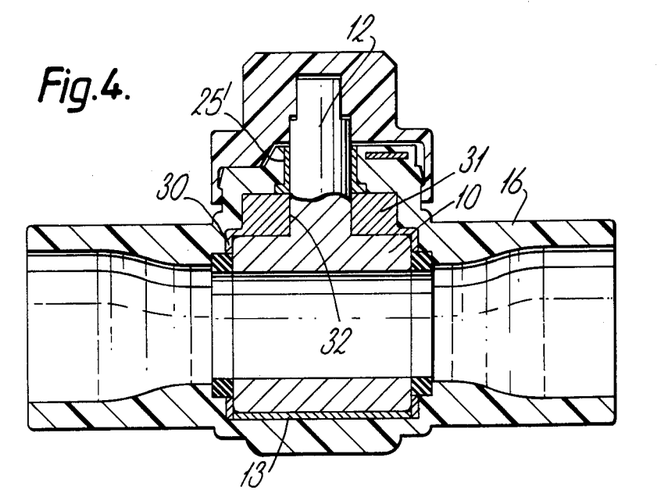
FIG. 4 is a view similar to FIGS. 2A and 3, of another valve embodying the invention.

In the valve of FIG. 4, the can 30 is open at its lower end and has, at its upper end thereof, a thickened top 31 which engages the flat upper surface of the plug 10, the top 31 having a cylindrical bore 32 therethrough through which the stem 12 extends. Above the base 31, the stem 12 extends through a sealing sleeve 24', axially shorter than the sleeve 24 of FIG. 2, to the upper surface of the body 16. A flat circular base plate 13 of sheet metal, fitting closely within the lower open end of the can 30, engages the bottom surface of the plug 10.

Figure 5:
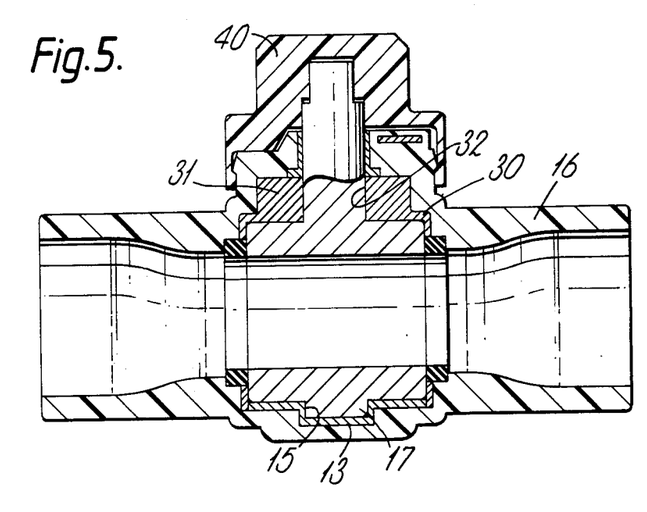
FIG. 5 is a sectional view, similar to FIG. 4, of a variant of the valve of FIG. 4.

The valve of FIG. 5 is identical with that of FIG. 4 except that the base plate 13, in a manner similar to the plate 13 in FIG. 3, has a central circular depression 15 in its upper surface, corresponding to a projection from its lower surface, the depression 15 receiving, as a close rotating fit, a short cylindrical boss 17 projecting downwardly from the bottom of the plug 10, to assist in locating the plug for rotation in the moulded valve body.

Figure 6:
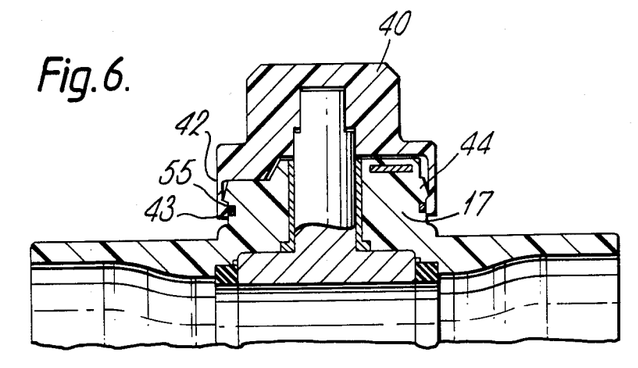
FIG. 6 is a partial sectional view, illustrating an optional detail of the valve of FIGS. 2A to 2C, FIGS. 7A to 7F are detailed sectional views illustrating various forms of seal arrangements which may be used in the plug valves shown in FIGS. 1 to 5.

As shown in FIG. 6, the cap 40 may be sealed with respect to the neck portion 17 of the valve body by means of an "O" ring 55 accommodated in a peripheral groove around the neck portion 17 of the valve body. As shown the "O" ring 55 is disposed below the collar 44 and is sealingly engaged by the inner surface of the rib 43 provided at the lower edge of the skirt 42 of cap 40.

Figure 7A:
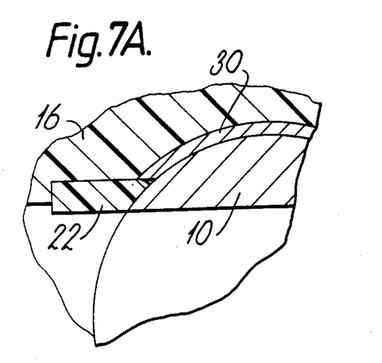
Figure 7B:
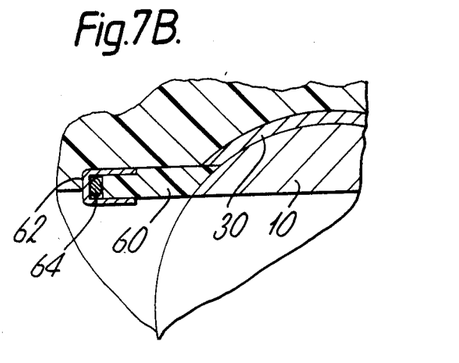
Figure 7C:
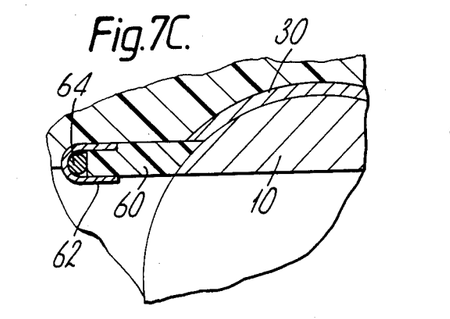

The seals 22 may take various forms. Thus, as shown in FIG. 7A, each seal 22 may simply be a unitary annular body of appropriate material such as PTFE or may, as shown in FIG. 7B, comprise an annular body 60 of PTFE which engages the peripheral surface of the plug 10, a rearward edge portion of the body 60 remote from the plug 10, being of reduced radial thickness and being received within an annular stainless steel carrier channel 62, "U" shaped in axial section, an "O" ring 64 being located, under axial compression, within the carrier channel, between the rear end of the sealing member 60 and the base channel 62. FIG. 7C illustrates a similar arrangement utilising a slightly different shaped carrier channel.

Figure 7D:
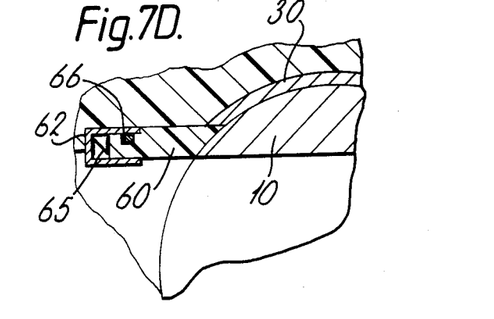

In the modification shown in FIG. 7D, the "O" ring of FIG. 7B is replaced by an annular stainless steel spring 65 designed to urge the sealing member 60 towards the plug 10 and a separate "O" ring 66 is located in a peripheral channel in the rearward part of the sealing member 60 which is received within the carrier channel 62, the "O" ring 66 engaging the adjoining wall of the carrier channel.

Figure 7E:
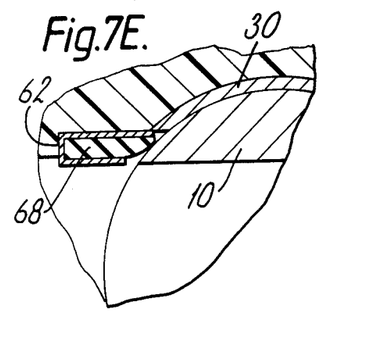

In the arrangement of FIG. 7E, the seal comprises an annular sealing member 68 of vulcanised rubber, received in a stainless steel carrier channel 62 of which the walls extend almost to the surface of the plug 10, the sealing member 68 being under slight axial compression so as to be urged by its own resilience into sealing engagement with the periphery of plug 10.

Figure 7F:
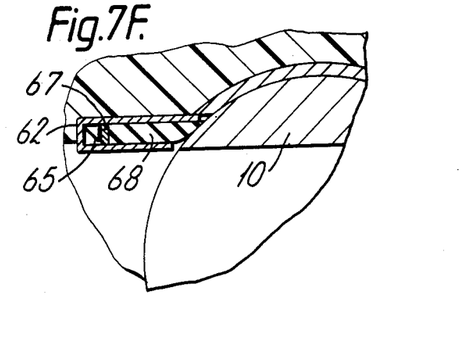

The arrangement of FIG. 7F is simlar to that of FIG. 7E except that the vulcanised rubber sealing member 68 is backed by an annular spring 65 similar to the spring 65 in FIG. 7D, the spring acting between the base of the carrier channel and an annular plate 67 acting in turn on the rearward end of the sealing member 68.

Figures 9, 10:
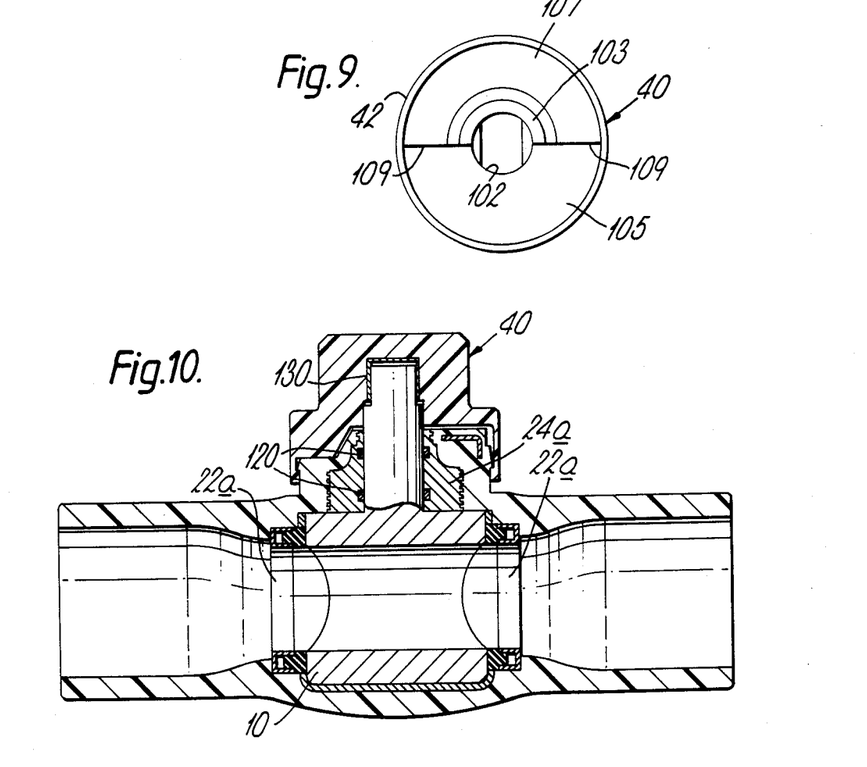
FIG. 9 is an underneath plan view of the operating cap.
FIG. 10 is a view, similar to FIG. 2A, of yet another form of valve embodying the invention.

FIG. 10 is an axial-section view of a further valve embodying the invention, and which is similar to that described with reference to FIGS. 2A to 2C. Like parts in FIG. 10 and in FIGS. 2A to 2C have like references. The principal difference between the valve of FIG. 10 and that of FIGS. 2A to 2C is that, in place of the thin walled bearing sleeve 24 of FIG. 2A, the valve of FIG. 10 has a bearing member 24a of substantial thickness and more similar in overall form to the bearing 24 of FIG. 1, the bearing member 24a having the form of a solid of rotation of the sectional shape shown, providing a central bore which receives the plug spindle 12 as a close rotating fit and a flat annular lower face which engages the upper face of the plug 10 over a substantial part of the radial extent thereof, leaving only an annular region of the upper face of the plug, adjacent the upper edge of the can 30, exposed to the plastics material of the valve body 16. The bearing member 24a has annular grooves formed around the bore therethrough in which are located 'O' rings 120 which seal the member 24a with respect to spindle 12. The member 24a may be formed of a suitable plastics such as medium density polyethylene (MDPE) and has peripheral annular ribs or fins which ensure that it is firmly engaged in the material of the valve body when the latter is moulded. The valve of FIG. 10 preferably has composite seal assemblies, indicated at 22a, for example of the type illustrated in FIGS. 7B to 7F.

In the valve of FIG. 10, the cap 40 is provided with a metal reinforcement 130 which defines the flat faces of the non-circular recess 12 and which engage the flats on the spindle 12. The reinforcement 30 conveniently takes the form of a U-shaped clip of stainless steel sheet material.

In the embodiments described, the can 30 is preferably of stainless steel but may alternatively be of brass, acetal or PTFE, or of brass or stainless steel coated with PTFE. The plug 10 may be of gunmetal, stainless steel, acetal or C.P.V.C., of metal (such as brass or stainless steel) encapsulated in PTFE or in acetal, for example.

The bearings 24, 24a, 24' may be of PTFE formed by machining or moulding, or of some other appropriate low-friction material.

Whilst in the valves shown in the drawings, the passage through the valve body extends straight through the valve body, it will be appreciated that similar constructional arrangements, utilising a can surrounding the valve plug and moulded or otherwise incorporated in the body, may be used in plug valves in which the fluid passage through the valve comprises two parts extending along respective axes at an angle to one another, one said part extending through one tubular spigot to the central part of the valve and the other said part extending through another tubular spigot from the central part of the valve, with said two spigots being at an angle of 90°. In such an arrangement, of course, the passage through the valve plug will be appropriately shaped and the ports in the can appropriately arranged so that the passage through the plug ends in ports which register with the respective parts of said passage in the open position of the valve. Similar arrangements may likewise be utilised in a valve having a valve body from which three tubular spigots extend from the central region accommodating the plug, for example with the valve body having a 'T' or a 'Y' shaped configuration and the valve being a two or three-way valve, with the passage or passages in the valve plug and the ports in the can, being again appropriately formed and arranged.

In the valves shown in the drawings, the plug is substantially circular, but it will be appreciated that other shapes having rotational symmetry about the axis of the plug stem may be utilised, and the can may be of split construction, i.e. made in two parts which can be brought together around the plug, to facilitate such constructions. Thus, for example, the plug may be spherical (the valve being a so-called ball-valve) with the can comprising two hemispherical shells adapted to embrace the spherical plug or ball. The terms 'plug' and 'can' as used in the claims are intended to be broad enough to cover such arrangements.

It will be appreciated that whilst the particular valves shown in the drawings are intended for use with gaseous fluids, valves of a corresponding construction can be used with liquids.

I claim

1. A method of manufacturing a plug valve including the steps of: providing a plug with a passage therethrough and a stem extending therefrom along an axis transverse to said passage, providing a metal can of a form to receive said plug as a close rotatable fit to permit rotation of the plug in the can about said axis, the can having, in the wall thereof, ports for registration with said passage in the plug, said stem being of reduced diameter with respect to said plug, inserting said plug in said can, moulding plastics material, in a liquid or plastic condition around said plug and can to form, after solidification of the plastics material, a body of said plastics material surrounding said plug and can and embracing said stem, with the spindle projecting from said body, said body having a passage therethrough which is in register with said ports in the can and which in one rotational position of the plug about said axis is in register with said passage in the plug and in another rotational position of said plug is blocked by the plug.

2. A method according to claim 1 including positioning annular seals relative to the can and plug, prior to the moulding of said plastics material, so that each said annular seal extends within a respective said port in the can and around the periphery thereof and bears sealingly on the surface of the plug, said plastics material being extended also around said seals to locate the same.

3. A plug valve comprising:
   a monolithic body of plastic material affording a passage for a fluid therethrough;
   a plug mounted in said body intermediate the ends of the passage such that the body surrounds the plug, preventing removal of the plug from the body, wherein the plug contains a passage therethrough for fluid, and wherein the plug is mounted for rotation in the body about an axis transverse to the passages to rotate between a position in which the passages in the plug and the valve body are in register allowing fluid to pass through the valve, and a position in which the passage in the plug is out of register with the passage in the body preventing passage of fluid through the valve;
   an operating stem extending from the plug along said axis, said stem having a diameter less than the diameter of the plug and projecting from said body;
   a metal can encircling the plug with said can being provided with ports registering with the passage in the body, and with said can being embedded fixedly in the body, and the plug being received as a close rotatable fit within the metal can;
   annular recesses formed around the passage of said body on each side of, and adjacent to the plug; and
   annular seals fitted in the annular recesses and projecting axially through said ports in the can to engage sealingly the plug around the peripheries of the ports.

* * * * *